(12) United States Patent
Agathocleous et al.

(10) Patent No.: US 10,017,030 B2
(45) Date of Patent: Jul. 10, 2018

(54) EFFICIENT TRANSFER OF HEAT TO PASSENGER CABIN

(71) Applicant: Hanon Systems, Daejeon (KR)

(72) Inventors: Nicos Agathocleous, Canton, MI (US); John Meyer, Northville, MI (US)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/277,072

(22) Filed: Sep. 27, 2016

(65) Prior Publication Data

US 2018/0086177 A1 Mar. 29, 2018

(51) Int. Cl.

| F23L 15/02 | (2006.01) |
|---|---|
| F28D 17/00 | (2006.01) |
| B60H 1/00 | (2006.01) |
| B60H 1/22 | (2006.01) |
| B60H 1/32 | (2006.01) |
| B60L 11/18 | (2006.01) |

(52) U.S. Cl.
CPC ..... *B60H 1/00492* (2013.01); *B60H 1/00385* (2013.01); *B60H 1/00885* (2013.01); *B60H 1/2221* (2013.01); *B60H 1/2225* (2013.01); *B60H 1/3204* (2013.01); *B60L 11/1809* (2013.01); *B60H 2001/224* (2013.01); *B60H 2001/2253* (2013.01)

(58) Field of Classification Search
CPC ............ B60H 1/00478; B60H 1/00492; B60H 1/00358; B60H 1/00885; B60H 1/2221; B60H 1/2225; B60H 1/3204; B60H 2001/224; B60H 2001/2253; B60L 11/1809
USPC .......................................................... 165/4
See application file for complete search history.

(56) References Cited

U.S. PATENT DOCUMENTS 6,105,659 A * 8/2000 Pocol ................. B60H 1/00478
165/10
2009/0095015 A1 4/2009 Kerler et al.

FOREIGN PATENT DOCUMENTS

JP 2001080340 A 3/2001

* cited by examiner

*Primary Examiner* — Davis Hwu
(74) *Attorney, Agent, or Firm* — Shumaker, Loop & Kendrick, LLP; James D. Miller (57) ABSTRACT

A method of efficiently heating a passenger cabin of a vehicle includes heating a first fluid using a fluid heater. The first fluid flows through a thermal storage element to transfer thermal energy to the thermal storage element. The heating of the first fluid and the thermal storage element occurs during a recharging of a rechargeable power source used to power the vehicle. During operation of the vehicle and following discontinuation of the recharging of the rechargeable power source, the thermal energy stored to the thermal storage element is transferred to air to be distributed to the passenger cabin of the vehicle by flowing the first fluid through a first heat exchanger in thermal communication with the air to be distributed to the passenger cabin of the vehicle, thereby extending a range of the vehicle.

12 Claims, 3 Drawing Sheets

EFFICIENT TRANSFER OF HEAT TO PASSENGER CABIN

FIELD OF THE INVENTION

The invention relates to a thermal energy management system for a vehicle, and more particularly to a method of exchanging thermal energy with air to be distributed to a passenger cabin of the vehicle.

BACKGROUND OF THE INVENTION

A vehicle typically includes a climate control system which maintains a temperature within a passenger compartment of the vehicle at a comfortable level by providing heating, cooling, and ventilation. Comfort is maintained in the passenger compartment by an integrated mechanism referred to in the art as a heating, ventilating and air conditioning (HVAC) system. The HVAC system conditions air flowing therethrough and distributes the conditioned air throughout the passenger compartment.

Typically, a compressor of a refrigeration system provides a flow of a fluid having a desired temperature to an evaporator disposed in the HVAC system to condition the air. The compressor is generally driven by a fuel-powered engine of the vehicle. However, in recent years, vehicles having improved fuel economy over the fuel-powered engine are becoming increasing more common. One example of a vehicle having an improved fuel economy includes electric vehicles or hybrid electric vehicles utilizing at least one rechargeable battery as an energy source. The rechargeable battery may be used to power an electric motor and various other components of the vehicle during use of the vehicle. The distance the vehicle is capable of traveling following a full charging of the rechargeable battery may be referred to as a range of the vehicle or the rechargeable battery. Following use of the vehicle, the rechargeable battery is recharged by placing the rechargeable battery in electrical communication with an energy source. In many instances, the rechargeable battery is placed in electrical communication with energy source via an electrical cord and plug assembly formed between the rechargeable battery and the energy source. This electrical cord and plug assembly may include an outdoor charging station or an electrical outlet formed in a garage or outdoor parking area.

The climate control system of the electric vehicle or the hybrid electric vehicle having the rechargeable battery as the energy source must be modified in comparison to the climate control system of the vehicle having the fuel based energy source due to the reduced amount of waste heat generated by the electric vehicle in comparison to an internal combustion engine, for example. In many instances, energy must be taken directly from the rechargeable battery to power various components of the climate control system. For example, the rechargeable battery may be used to power a compressor directly or indirectly via the electric motor in order to circulate a refrigerant through a refrigerant and/or heat pump circuit used to cool and/or heat air distributed to a passenger cabin of the electric vehicle. The rechargeable battery may also be used to power an electric heater such as a positive temperature coefficient (PTC) heater used to heat the air distributed to the passenger cabin. Alternatively, the rechargeable battery may be used to heat a fluid such as a coolant that exchanges thermal energy with air to be distributed to the passenger cabin. The requirement that such components be powered by the rechargeable battery draws energy from the rechargeable battery that would otherwise be utilized to power the electric motor driving the electric vehicle, thereby reducing the effective range of the vehicle when the climate control system is being utilized.

This problem is especially evident when the electric vehicle is exposed to very low ambient temperatures, such as temperatures below 0° C. It is often important that warm air be delivered to the passenger cabin immediately following a discontinuation of the electrical communication between the rechargeable battery and the energy source and entry of the passenger into the passenger cabin to both ensure comfort of the passenger as well as to eliminate any frost, fog, or mist that may have accumulated on the windows of the vehicle. Accordingly, the climate control system of the electric vehicle may be required to begin operation immediately following the end of the recharging process while maximizing the amount of energy delivered to the compressor, the electric heater, or the coolant heater used for heating the air distributed to the passenger cabin, thereby reducing the range of the rechargeable battery and the vehicle immediately following the recharging process. Additionally, such heating methods may not be able to supply enough heat energy in a timely fashion as methods such as heating the coolant to exchange thermal energy with the air distributed to the passenger cabin require additional time for the desired degree of heating to take place.

It would therefore be desirable to produce a thermal management system capable of efficiently transferring thermal energy to a passenger cabin of a vehicle while minimizing a power requirement of an power source used to power the vehicle to maximize a range of the vehicle.

SUMMARY OF THE INVENTION

In concordance and agreement with the present invention, a thermal energy management system for efficiently transferring thermal energy to a passenger cabin of a vehicle while maximizing a range of the vehicle has surprisingly been discovered.

In one embodiment of the invention, a method of transferring thermal energy to air distributed to a passenger cabin of a vehicle is disclosed. The vehicle is powered by a rechargeable power source. The method comprises the steps of adding thermal energy to a thermal storage element during a charging of the rechargeable power source and transferring the thermal energy from the thermal storage element to the air distributed to the passenger cabin following a discontinuation of the charging of the rechargeable power source.

In another embodiment of the invention, a method of heating air distributed to a passenger cabin of a vehicle powered by a rechargeable power source is disclosed. The method comprises the steps of heating a first fluid, flowing the first fluid through a thermal storage element to heat the thermal storage element, and transferring heat from the thermal storage element to the air distributed to the passenger cabin.

BRIEF DESCRIPTION OF THE DRAWINGS

The above, as well as other objects and advantages of the invention, will become readily apparent to those skilled in the art from reading the following detailed description of various embodiments of the invention when considered in the light of the accompanying drawings in which.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
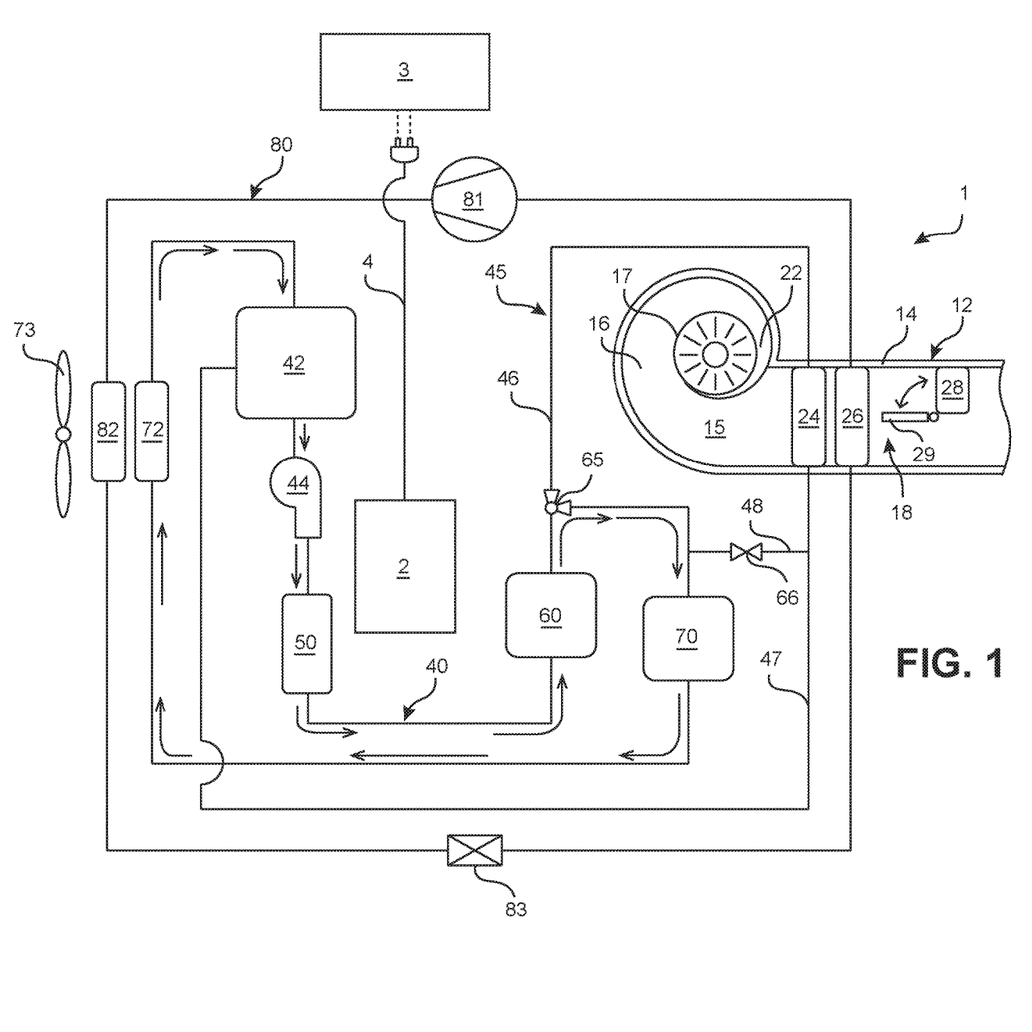
FIG. 1 is a fragmentary schematic flow diagram of a thermal energy management system of a vehicle powered by a rechargeable power source when operating to cool components of the thermal energy management system.

FIG. 1 illustrates a thermal energy management system 1 of a vehicle (not shown) according to an embodiment of the invention. The thermal management system 1 collectively refers to systems and components of the vehicle configured to transfer thermal energy for efficient operation of the vehicle. The thermal management system 1 may include any systems or subsystems of the vehicle configured to cool vehicle components, perform work, or condition the air distributed to a passenger cabin of the vehicle, as non-limiting examples.

The thermal energy management system 1 may form a portion of a vehicle powered by an electric power source such as a rechargeable power source 2. The rechargeable power source 2 may accordingly be any form of rechargeable battery 2 for powering an electric vehicle as known in the art. The rechargeable battery 2 may refer to a plurality of batteries or battery cells (not shown) collectively storing the energy to be used to power operation of the vehicle. However, alternative rechargeable power sources may be used without departing from the scope of the present invention.

The vehicle may be purely electrically powered or the vehicle may in some instances be a hybrid system. The rechargeable battery 2 is placed in electrical communication with a power source 3 during a charging of the rechargeable battery 2. The electrical communication established between the rechargeable battery 2 and the power source 3 may include a cord or cable 4 extending therebetween. The power source 3 may for example be a power outlet and the cord or cable 4 may include one or more plugs or other electrical connectors for establishing the electrical communication between the power source 3 and the rechargeable battery 2. The electrical communication between the rechargeable battery 2 and the power source 3 may be selectively provided by a user of the vehicle in between uses of the vehicle to recharge the rechargeable battery 2. The electrical energy provided by the power source 3 may be used to both charge the rechargeable battery 2 while also powering the components of the vehicle normally powered by the rechargeable battery 2. Accordingly, the power source 3 may be used to power the components of the vehicle during the recharging process without negatively draining energy from the rechargeable battery 2 during the recharging process.

It should be understood that the power source 3 is formed independently of any system of the vehicle that may be used to recover or generate energy during operation of the vehicle. In other words, the power source 3 does not form a component of the vehicle such as an internal combustion engine performing work to generate electrical energy for recharging a battery of the vehicle, for example. The power source 3 may form a stationary charging location that is accordingly not normally accessible to the vehicle during operation of the vehicle.

The thermal energy management system 1 comprises an air conditioning module 12 and a first fluid circuit 40. The air conditioning module 12 forms a portion of a heating, ventilating, and air conditioning (HVAC) system of the vehicle. The HVAC system typically provides heating, ventilation, and air conditioning for a passenger cabin of the vehicle. The air conditioning module 12 is used to control at least a temperature of the passenger cabin. The module 12 illustrated includes a hollow main housing 14 with an air flow conduit 15 formed therein. The housing 14 includes an inlet section 16, a mixing and conditioning section 18, and an outlet and distribution section (not shown). In the embodiment shown, an air inlet 22 is formed in the inlet section 16. The air inlet 22 is in fluid communication with a supply of air (not shown). The supply of air can be provided from outside of the vehicle, recirculated from the passenger compartment of the vehicle, or a mixture of the two, for example. The inlet section 16 is adapted to receive a blower wheel 17 therein to cause air to flow through the air inlet 22. A filter (not shown) can be provided upstream or downstream of the inlet section 16 if desired.

The mixing and conditioning section 18 of the housing 14 includes a first heat exchanger 24, a second heat exchanger 26, and a heating device 28. The first heat exchanger 24 is disposed immediately upstream of the second heat exchanger 26. In the embodiment shown, the heating device 28 is disposed downstream of a blend door 29. The blend door 29 is adapted to selectively permit a flow of air through the heating device 28. In other embodiments, the blend door 29 may be disposed downstream of the heating device 28. It should be understood that various different configurations of the mixing and conditioning section 18 including alternative arrangements of the flows paths and actuating devices used to control flow through the flow paths may be used without departing from the scope of the present invention.

As shown in FIG. 1, the second heat exchanger 26 may form a portion of a refrigerant circuit 80 further comprising a compressor 81, a third heat exchanger 82, and an expansion member 83. In the embodiment depicted in FIG. 1, the second heat exchanger 26 acts as an evaporator of the refrigerant circuit 80 during a refrigeration operating mode for cooling and/or dehumidifying the flow of air passing through the mixing and conditioning section 18 while the third heat exchanger 82 is shown as acting as a condenser for removing heat energy from the refrigerant flowing through the refrigerant circuit 80. However, although not pictured in FIG. 1, it should be understood by one skilled in the art that the refrigerant circuit 80 may be adapted to include structure (not shown) such as additional conduits and valves for reversing an order through which the refrigerant flows through the second heat exchanger 26 and the third heat exchanger 82 when operating in a heat pump mode wherein the second heat exchanger 26 acts as a condenser for heating the flow of air through the mixing and conditioning section 18 while the third heat exchanger 82 acts as the evaporator. In such an instance, the compressor 81 is powered by the rechargeable battery 2 to power the heat pump operation of the second heat exchanger 26, thereby drawing energy from the rechargeable battery 2.

Although the second heat exchanger 26 has been shown as forming an evaporator of a refrigerant circuit, it should be understood that any device capable of cooling and/or dehumidifying the air flowing through the mixing and conditioning section 18 may be used without departing from the scope of the present invention. Additionally, the second heat exchanger 26 may alternatively be in fluid communication with a fluid other than the refrigerant of the refrigerant circuit 80 shown in FIG. 1, as desired.

The first heat exchanger 24 may be any form of heat exchanger suitable for exchanging heat with a flow of air therethrough. The first heat exchanger 24 may for example include a plurality of heat exchanger tubes formed between an inlet manifold tank and an outlet manifold tank, wherein the air to be distributed to the passenger cabin of the vehicle is caused to flow through openings formed between the heat exchanger tubes to promote a transfer of heat energy between a fluid carried within the first heat exchanger 24 and the air to be distributed to the passenger cabin.

The first fluid circuit 40 of the thermal energy management system 1 may form a coolant loop of the vehicle configured for cooling various components of the vehicle, and especially electrically powered components of the vehicle. The components may include an electric motor for powering the vehicle, the rechargeable battery 2, and other electrical components associated with operation of the vehicle such as an inverter, as non-limiting examples. It should be understood that the first fluid circuit 40 may be used to exchange thermal energy with any variety of different components or systems of the vehicle without departing from the scope of the present invention. A first fluid is circulated through the first fluid circuit 40 to exchange the thermal energy with the components. The first fluid may be any suitable fluid for exchanging thermal energy. The first fluid may for example be a coolant formed from glycol, water, or a glycol and water mixture, as a non-limiting example.

The first fluid circuit 40 includes a reservoir 42 acting as a source of the first fluid for circulating through the first fluid circuit 40. The first fluid is removed from the reservoir 42 and caused to circulate through the first fluid circuit 40 by a pump 44. The pump 44 is electrically powered directly or indirectly by the rechargeable battery 2 during operation of the vehicle. During a charging operation of the rechargeable battery 2, the pump 44 may be electrically powered, directly or indirectly, by the power source 3 in a manner wherein a charge level of the rechargeable battery 2, and therefore a driving range associated with the vehicle, remains the same or is increased despite the powering of the pump 44. Accordingly, operation of the pump 44 during the charging of the rechargeable battery 2 by the power source 3 does not negatively affect the range of the vehicle.

A fluid heater 50 is disposed downstream of the pump 44 with respect to the flow of the first fluid through the first fluid circuit 40. The fluid heater 50 may be any type of directly or indirectly electrically powered heating device suitable for heating a flow of a fluid therethrough. The fluid heater 50 may for example be a known form of glycol heater, as a non-limiting example. The fluid heater 50 may be powered directly or indirectly by the rechargeable battery 2 during operation of the vehicle. During a charging operation of the rechargeable battery 2, the fluid heater 50 may be electrically powered, directly or indirectly, by the power source 3 in a manner wherein a charge level of the rechargeable battery 2, and therefore a driving range associated with the vehicle, remains the same or is increased despite the powering of the fluid heater 50. Accordingly, operation of the fluid heater 50 during the charging of the rechargeable battery 2 by the power source 3 does not negatively affect the range of the vehicle.

A thermal storage element 60 is disposed downstream of the fluid heater 50. The thermal storage element 60 may be formed by any structure in fluid communication and/or heat exchange relationship with the first fluid circulating through the first fluid circuit 40. The thermal storage element 60 may be formed by one of the electrical components of the vehicle discussed hereinabove in need of cooling. For example, the thermal storage element 60 may be formed by a cooling system of an electrical component configured for exchanging thermal energy between the electrical component in need of cooling and the first fluid circulating through the first fluid circuit 40. The thermal storage element 60 may form a heat sink associated with the component to be cooled, for example. Alternatively, the thermal storage element 60 may be a structure configured to maximize the amount of thermal energy stored by the thermal storage element 60. The thermal storage element 60 may for example include a chamber (not shown) including a material configured for storing thermal energy therein. The material may be a phase change material configured to change phases when exchanging thermal energy with the first fluid. Any known structure or system for storing thermal energy may be used as the thermal storage element 60 without departing from the scope of the present invention. Additionally, the thermal storage element 60 may refer to a collective arrangement of a plurality of different structures or components in fluid communication and/or heat exchanger communication with the first fluid circulated through the first fluid circuit 40, as desired.

Additional components 70 in need of cooling may be disposed downstream of the thermal storage element 60. A switching valve 65 may be disposed between the thermal storage element 60 and the additional components 70. The additional components 70 may be any components requiring a heat exchange relationship with the first fluid such as electrical components that may be in need of cooling during operation of the vehicle. The components 70 may be any of the electrical components described hereinabove as potentially forming components suitable for acting as the thermal storage element 60. The components 70 may for example include the inverter, the rechargeable battery 2, the electric motor of the vehicle, or any other electrical components associated with operation of the vehicle. It should be apparent to one skilled in the art that the thermal storage element 60 may be selected from the various components 70 of the vehicle based on various conditions associated with the packaging arrangement of the vehicle, the manner in which energy is transferred between various systems of the vehicle, and the heat conductivity of the various different components, for example. Accordingly, a positioning of the switching valve 65 for diverting the flow of the first fluid from the remainder of the components 70 may be selected to most efficiently operate the first fluid circuit 40 based on the specific requirements of the vehicle having the first fluid circuit 40.

A fourth heat exchanger 72 is disposed downstream of the components 70 on the first fluid circuit 40. The fourth heat exchanger 72 may form a radiator of the first fluid circuit 40 for removing thermal energy from the first fluid following the removal of the thermal energy from the components 70. The fourth heat exchanger 72 may be in heat exchange relationship with a stream of air supplied by a fan or blower 73. The fan 73 may also be caused to direct the stream of air over the third heat exchanger 82 when the third heat exchanger 82 acts as the condenser of the refrigerant circuit 80, as desired. Alternative configurations of the third heat exchanger 82, the fourth heat exchanger 72, and the fan 73 may be used without departing from the scope of the present invention. Once the first fluid exits the fourth heat exchanger 72, the first fluid reenters the reservoir 42 to be recirculated through the first fluid circuit 40.

The first fluid circuit 40 includes a conditioning branch 45 having the first heat exchanger 24. A first portion 46 of the conditioning branch 45 extends from the switching valve 65 to the first heat exchanger 24 and a second portion 47 of the conditioning branch 45 extends from the first heat exchanger 24 to the reservoir 42 of the first fluid circuit 40. As shown in FIG. 1, the second portion 47 of the conditioning branch 45 may optionally include a reentry line 48 fluidly coupling the second portion 47 of the conditioning branch 45 to the first fluid circuit 40 intermediate the switching valve 65 and the components 70 of the first fluid circuit 40 in need of cooling. The reentry line 48 may include a valve 66 for selectively allowing the first fluid flowing through the second portion 47 of the conditioning branch 45 to reenter the first fluid circuit 40 upstream of the components 70 to allow the first fluid to exchange thermal energy with the components 70 and potentially the fourth heat exchanger 72 before entering the reservoir 42. However, as explained hereinafter, the thermal management system 1 may operate in the absence of the reentry line 48 and the valve 66, as desired.

Under some ambient conditions, the electronic components of the vehicle such as the components 70 (and in some cases the thermal storage element 60) may generate enough heat during operation of the vehicle (and hence during a period when the rechargeable battery 2 is not in electrical communication with the power source 3) to require cooling via circulation of the first fluid through the first fluid circuit 40. Accordingly, during such ambient conditions, the first fluid circuit 40 may be used wherein the switching valve 65 is adjusted to a position wherein the first fluid flows from the switching valve 65 and towards the components 70 without being circulated through the conditioning branch 45.

FIG. 1 includes arrows extending along the first fluid circuit 40 indicating a direction of flow of the first fluid when the vehicle is in operation and the first fluid circuit 40 is used to cool the components 70 (and potentially the thermal storage element 60, as needed) without flowing the first fluid through the conditioning branch 45. The first fluid is pumped from the reservoir 42 by the pump 44 while the fluid heater 50 is not in operation. As such, the fluid heater 50 does not add thermal energy to the first fluid when flowing therethrough and the first heater 50 does not require energy drawn from the rechargeable battery 2. The first fluid continues to flow through the first fluid circuit 40 including passing through the thermal storage element 60 and the other components 70 of the vehicle in need of cooling. The thermal energy of the thermal storage element 60 and the other components 70 is transferred to the first fluid to heat the first fluid. The first fluid then flows to the fourth heat exchanger 72 acting as radiator which removes the thermal energy that has been received by the first fluid by passing a stream of air over the fourth heat exchanger 72 using the fan or blower 73. The first fluid is thereby cooled and returned to the reservoir 42 to be recirculated for an additional cooling cycle.

In addition to serving a function as a coolant loop for cooling the various components 70 of the vehicle in need of cooling, the first fluid circuit 40 also can be used to serve a conditioning function wherein thermal energy is transferred between the first fluid and the air to be distributed to the passenger cabin. The conditioning function may include a heating conditioning function wherein additional thermal energy is supplied to the air to be distributed to the passenger cabin in addition to any thermal energy transferred to the first fluid via the heating device 28 (and in some systems the second heat exchanger 26 through operation of the compressor 81). The heating conditioning function be a suitable for use when the ambient temperature is low, such as below 0° C., for example, and the passenger of the vehicle requires the immediate distribution of heated air to properly carry out a defrost or demist function or to meet comfort requirements of the passenger.

In the absence of the conditioning function of the first fluid circuit 40, the thermal management system 1 initially relies primarily on the heating device 28 to provide the heating of the air to be distributed to the passenger cabin of the vehicle, wherein the heating device 28 is powered directly by the rechargeable battery 2. In some systems, the air to be distributed to the passenger cabin may also be heated by the second heat exchanger 26 when the second heat exchanger 26 acts as a condenser of the refrigerant circuit 80 during a heat pump mode. The operation of the second heat exchanger 26 as condenser requires operation of the compressor 81, which is powered directly or indirectly by the rechargeable battery 2. Thus, operation of either of the heating device 28 or the compressor 81 requires energy to be drawn from the rechargeable battery 2, thereby reducing the range of the vehicle.

The conditioning function of the thermal energy management system 1 includes at least a thermal energy storage stage and a thermal energy harvesting stage. The thermal energy storage stage includes a transfer of thermal energy to the thermal storage element 60 during a charging of the rechargeable battery 2. The thermal energy harvesting stage includes a transfer of the thermal energy stored to the thermal storage element 60 to the air to be distributed to the passenger cabin of the vehicle following a discontinuation of the charging process and during operation of the vehicle wherein power is drawn from the rechargeable battery 2. Each stage is described in turn hereinafter.

Figure 2:
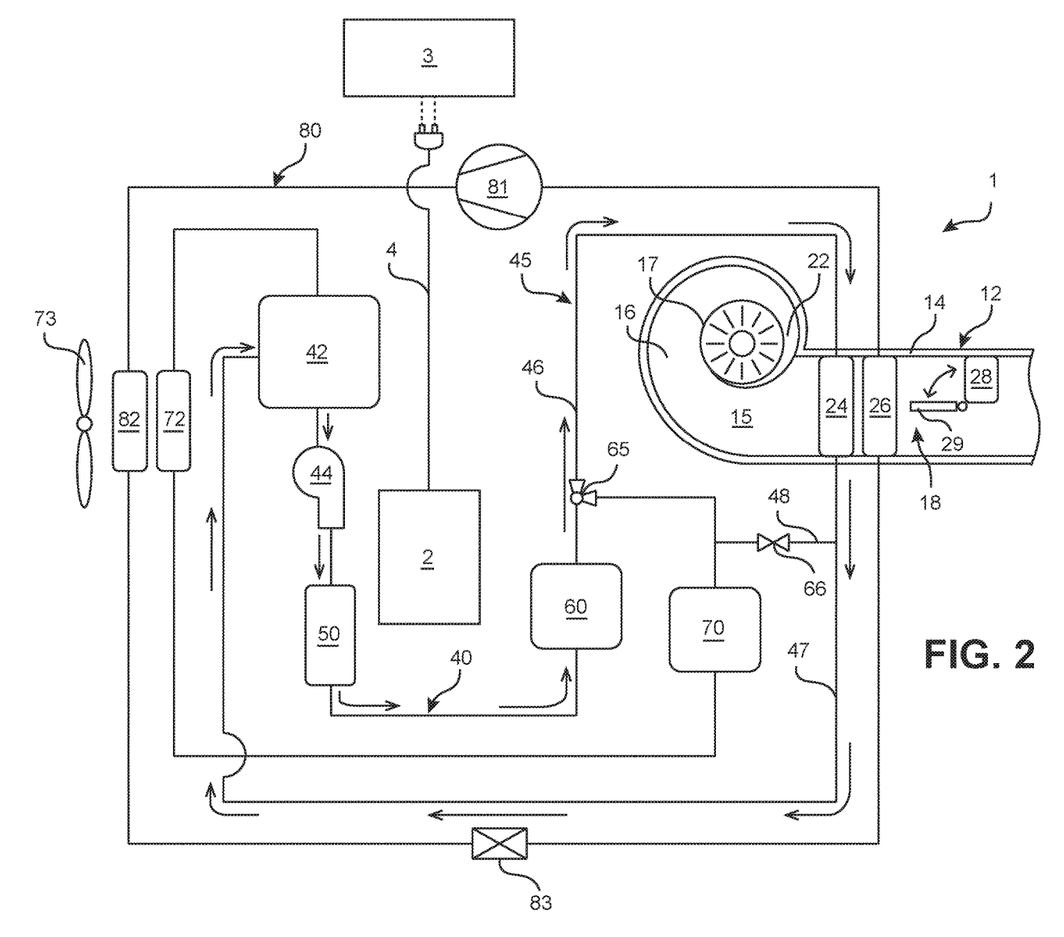
FIG. 2 is a fragmentary schematic flow diagram of the thermal energy management system of FIG. 1 when performing a conditioning function.

FIG. 2 includes arrows extending along portions of the first fluid circuit 40 and the conditioning branch 45 indicating a direction of flow for the first fluid when the first fluid circuit 40 is performing the thermal energy storage stage of the conditioning function. The flow configuration shown in FIG. 2 is initially carried out during a period when the vehicle is not in operation and the rechargeable battery 2 of the vehicle is being recharged by establishing electrical communication between the power source 3 and the rechargeable battery 2. As explained hereinabove, the rechargeable battery 2 is able to distribute electrical energy to the various components of the vehicle while in electrical communication with the power source 3 without negatively reducing a charge level of the rechargeable battery 2 or the range of the vehicle. Alternatively, it should be understood that alternative configurations wherein the power source 3 is caused to directly power the components of the vehicle while independently charging the rechargeable battery 2 may also be used without departing from the scope of the present invention so long as the process used does not decrease the charge level of the rechargeable battery 2.

During the thermal energy storage stage, the electrical energy delivered by the power source 3 is directly or indirectly (via the rechargeable battery 2) distributed to the pump 44 and the fluid heater 50 to power operation thereof. The first fluid is pumped from the reservoir 42 by the pump 44 while the fluid heater 50 is activated. The fluid heater 50 accordingly adds thermal energy to the first fluid to heat the first fluid. The heated first fluid then flows through the thermal storage element 60. At least a portion of the thermal energy added to the first fluid is transferred from the first fluid to the thermal storage element 60. As explained hereinabove, the thermal storage element 60 may comprise any thermally conductive structure, fluid, or material suitable for storing the thermal energy of the first fluid.

The switching valve 65 is actuated to a position wherein the flow through the first fluid circuit 40 is directed toward the first portion 46 of the conditioning branch 45 instead of toward the components 70 disposed downstream of the thermal storage element 60. The first fluid flows through the first portion 46 of the conditioning branch 45 and enters the first heat exchanger 24. At least a portion of the thermal energy added to the first fluid is transferred to the structure forming the first heat exchanger 24. The first fluid then exits the first heat exchanger 24 and flows back to the reservoir 42 through the second portion 47 of the conditioning branch 45. The first fluid can then once again be circulated through the first fluid circuit 40 and the conditioning branch 45 to continue to heat the first fluid and to continue to store thermal energy in the thermal storage element 60.

The heating of the first fluid and the storage of the thermal energy in the thermal storage element 60 may continue until the electrical communication between the power source 3 and the rechargeable battery 2 has been discontinued in anticipation of operating the vehicle in the ambient environment. Upon discontinuation of the electrical communication, the fluid heater 50 and the pump 44 are no longer operated to prevent a drain of energy of the rechargeable battery 2 when not charged by the power source 3.

Upon initial activation of the vehicle when exposed to low ambient temperatures, it is common for the passenger cabin of the vehicle to require immediate heating. Use of the heating device 28 and/or the compressor 81 during the initial heating of the passenger cabin undesirably draws energy from the rechargeable battery 2. Additionally, the large difference in temperature often present between the low temperature ambient environment and the desired temperature for the passenger cabin of the vehicle causes the amount of energy needed to power the heating device 28 and/or the compressor 81 to be increased in comparison to normal operating conditions. The conditioning function of the thermal energy management system 1 provides a solution to this problem by utilizing the thermal energy stored in the thermal storage element 60 to provide at least some of the thermal energy required to heat the air to be distributed to the passenger cabin.

The first fluid includes the same flow configuration during the thermal energy harvesting stage as during the thermal energy storage stage, hence description of the thermal energy harvesting stage is also made with reference to FIG. 2. The passenger of the vehicle activates operation of the vehicle following the discontinuation of the recharging process. At this stage, operation of any components of the vehicle requiring the electrical energy of the rechargeable battery 2 (in the absence of the energy provided by the power source 3) causes the charge level of the rechargeable battery 2 to be lowered, thereby lowering the range of the vehicle. Thus, during operation of the vehicle following the thermal energy storage stage, the fluid heater 50 is not operated to prevent energy drainage from the rechargeable battery 2. The pump 44 is operated to cause the first fluid to flow through the first fluid circuit 40. The switching valve 65 is maintained in the position wherein the first fluid is caused to flow through the conditioning branch 45 before returning to the reservoir 42.

The blower 17 disposed in the inlet section 16 of the air conditioning module 12 is activated to cause the air to be distributed to the passenger cabin to flow through the air flow conduit 15. The air then encounters the first heat exchanger 24. As explained previously, the structure forming the first heat exchanger 24 may store at least a portion of the thermal energy added to the first fluid by the fluid heater 50. Additionally, it should be understood that the first fluid itself stores at least a portion of the thermal energy added to the first fluid by the fluid heater 50. The air exchanges thermal energy with the first fluid through the structure of the first heat exchanger 24 to increase the temperature of the air to be distributed to the passenger cabin while decreasing the temperature of the first fluid flowing through the first heat exchanger 24. The first fluid then returns to the reservoir 42 where the pump 44 circulates the first fluid through the thermal storage element 60. The thermal storage element 60 transfers thermal energy stored in the thermal storage element 60 to the first fluid to heat the first fluid. The heated first fluid is then directed back to the first heat exchanger 24. The thermal energy transferred to the first fluid from the thermal storage element 60 is then transferred to the air to be distributed to the passenger cabin via the first heat exchanger 24. The first fluid continues to circulate through the first fluid circuit 40 and the conditioning branch 45 to repeat the transfer of the thermal energy from the thermal storage element 60 to the air to be distributed to the passenger cabin.

In some circumstances, the flow of the first fluid through the first heat exchanger 24 provides all of the thermal energy required to be transferred to the air to be distributed to the passenger cabin in accordance with the requirements of the passenger. The heating device 28 and/or the compressor 81 are not required to be operated under such circumstances, hence the energy required from the rechargeable battery 2 for powering the HVAC system is minimized during the initial heating of the passenger cabin. In other circumstances, the thermal energy supplied by the first fluid circulating through the first heat exchanger 24 is not great enough to suitably heat the air to be distributed to the passenger cabin in accordance with the requirements of the passenger. The heating device 28 and/or the compressor 81 may accordingly be activated to operate as a supplemental source of thermal energy, but the heating device 28 and the compressor 81 may be operated at a reduced speed and/or setting requiring a minimal amount of electrical energy delivered from the rechargeable battery 2 to power the heating device 28 and/or the compressor 81. Accordingly, the first heat exchanger 24 improves a range of the vehicle under either circumstance as at least a portion of the thermal energy required for heating the passenger cabin is recovered from the thermal storage element 60 in place of thermal energy that would otherwise originate from the electrical energy stored in the rechargeable battery 2.

The first fluid may be caused to continue to flow through the first heat exchanger 24 until the thermal energy stored to the thermal storage element 60 is lowered to an extent that the first heat exchanger 24 no longer adds thermal energy to the air to be distributed to the passenger cabin. The first heat exchanger 24 may be used to continue to add thermal energy to the air distributed to the passenger cabin even after the passenger cabin has initially reached the desired temperature, thereby further preventing the need for additional energy to be drawn from the rechargeable battery 2 for powering the heating device 28 and/or the compressor 81 following the initial heating of the passenger cabin.

Figure 3:
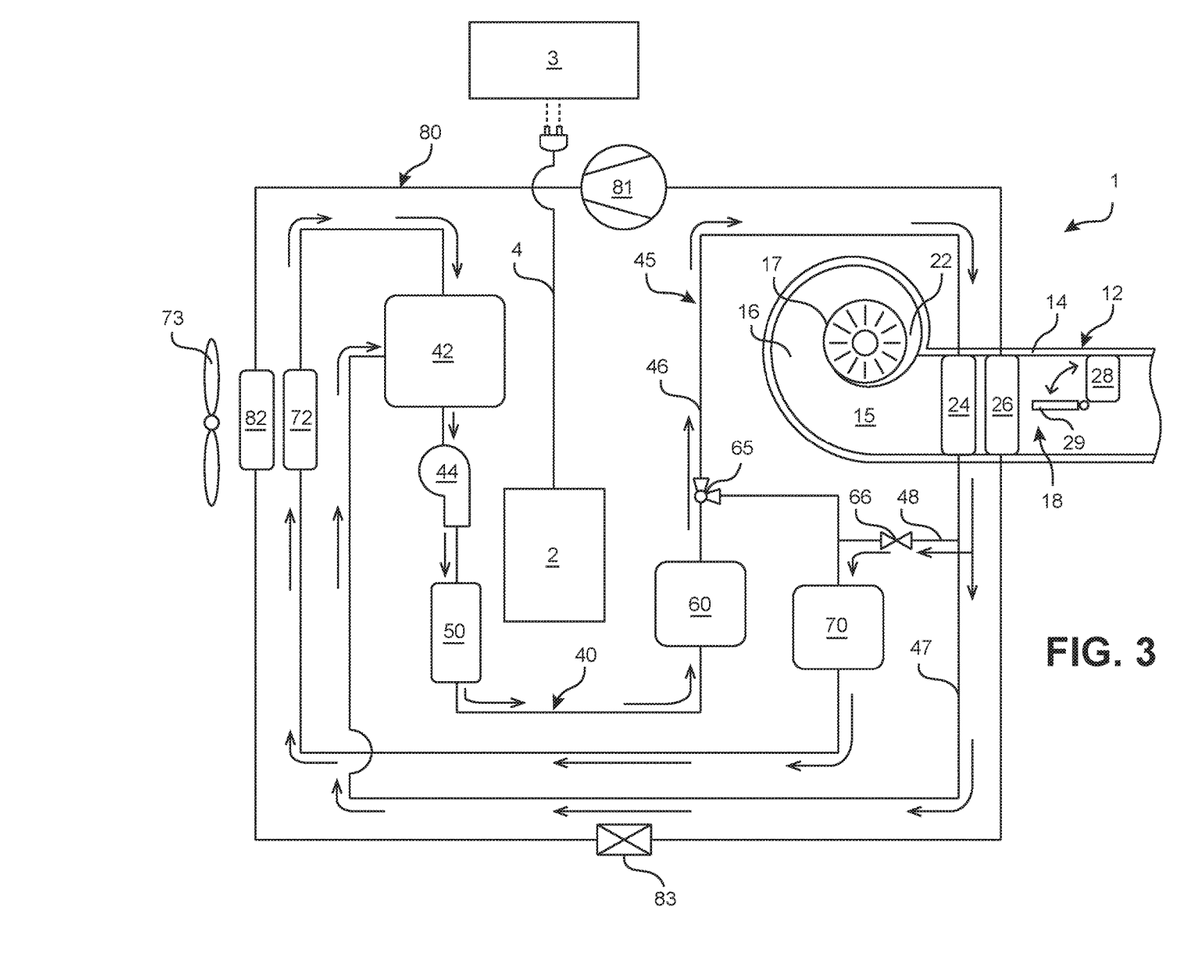
FIG. 3 is a fragmentary schematic flow diagram of the thermal energy management system of FIG. 1 when performing a dual cooling and conditioning function.

As discussed previously, the second portion 47 of the conditioning branch 45 may optionally include the reentry line 48 for selectively fluidly coupling the conditioning branch 45 to the first fluid circuit 40 upstream of the components 70. The reentry line 48 is opened by adjusting the valve 66 to allow at least a portion of the flow of the first fluid exiting the first heat exchanger 24 to reenter the first fluid circuit 40. As shown in FIG. 3, which includes arrows indicating a flow of the first fluid while the conditioning branch 45 is in use and the valve 66 is opened, the at least a portion of the flow exiting the first heat exchanger 24 flows through the components 70 and the fourth heat exchanger 72 before returning to the reservoir 42 to be recirculated by the pump 44.

The reentry line 48 may be used to recover heat energy originating from the components 70 while the thermal energy of the thermal storage element 60 is used to heat the air to be distributed to the passenger cabin. If the components 70 are electrical components that generate heat during use, the components 70 may reach a temperature wherein the components 70 are at a greater temperature than the first fluid after the first fluid has transferred thermal energy to the air to be distributed to the passenger cabin. Accordingly, the at least a portion of the first fluid flowing through the reentry line 48 receives thermal energy from the components 70 to heat the first fluid. The blower or fan 73 may be turned off in order to cause a minimal amount of thermal energy to be removed from the first fluid when the first fluid flows through the fourth heat exchanger 72. The heated first fluid is then able to recirculate through the remainder of the first fluid circuit 40 including the thermal storage element 60 and the first heat exchanger 24 to extend the thermal energy harvesting stage of the conditioning function even further, thereby further improving the range of the vehicle. The reentry line 48 may accordingly be used when the first fluid circuit 40 is transitioning from the conditioning function using the conditioning branch 45 to the normal cooling function shown by the flow configuration of FIG. 1 wherein the first fluid does not flow through the conditioning branch 45.

The conditioning function of the thermal energy management system 1 has been described as being suitable for use in heating function wherein the ambient temperature is low and heating of the passenger cabin is required immediately upon activation of the vehicle. Because such conditions may not be present for each charging session of the rechargeable battery 2, such as during warm seasons or when the vehicle is charged in a heated indoor setting, a control system (not shown) of the vehicle may be configured to determine when the conditioning function should be employed upon the commencement of a charging session wherein the rechargeable battery 2 is placed in electrical communication with the power source 3. The control system may for example activate the conditioning function when selected by the passenger preceding or during the charging session. The control system may alternatively only activate the conditioning function when a temperature sensor (not shown) measuring the ambient temperature or the internal cabin temperature determines that the conditioning function may be required to meet the demands of the passenger upon activation of the vehicle. The control system may alternatively activate the conditioning function when information communicated to the control system, such as weather information communicated to the control system by a wireless communication method, indicates that the conditioning function may be required. The control system may alternatively activate the conditioning function when the date and geographic location of the vehicle indicates that the conditioning function may be required. Alternative control methods for activating and controlling the conditioning function may also be used without departing from the scope of the present invention.

The control system of the vehicle may also be used to determine when the heat capacity of the thermal storage element 60 has been reduced to a level that continued circulation of the first fluid is no longer beneficial to heating the air to be distributed to the passenger cabin. For example, one or more temperature sensors (not shown) may be disposed along the first fluid circuit 40 and the conditioning branch 45 to determine a temperature of the first fluid or the thermal storage element 60 throughout the thermal energy harvesting stage of the conditioning function. The control system may determine that operation of the pump 44 is no longer energy efficient in view of a decreased heat capacity of the thermal storage element 60, hence flow through the conditioning branch 45 and the first heat exchanger 24 may be discontinued. The control system may accordingly cease operation of the pump 44 to discontinue the circulation of the first fluid through the conditioning branch 45 or the control system may continue operation of the pump 44 while the switching valve 65 is switched to a position wherein the first fluid flows through the components 70 and the fourth heat exchanger 72 to perform the cooling function of the first fluid circuit 40. In other embodiments, the control system operates the first fluid circuit 40 in the thermal energy harvesting stage during operation of the vehicle for a predetermined period of time before discontinuing the flow of the first fluid through the first heat exchanger 24. In other embodiments, a temperature sensor (not shown) associated with one of the components 70 indicates that the cooling function of the first fluid circuit 40 is required, thereby ending operation in the thermal energy harvesting stage by switching the switching valve 65 to direct the first fluid to the components 70 and the fourth heat exchanger 72. Alternative control methods for controlling operation of the first fluid circuit 40 may also be used without departing from the scope of the present invention.

The first fluid circuit 40 has thus far been described as performing a heating conditioning function for heating the passenger cabin when the vehicle is exposed to low ambient temperatures. However, it should be understood by one skilled in the art that the heating conditioning function described hereinabove may be adapted to a cooling conditioning function by appropriate modification of the first fluid circuit 40. For example, the fluid heater 50 may be replaced by an electrical component or an electrically driven system capable of a cooling function. The fluid heater 50 may accordingly be replaced with an electrically powered cooling device (not shown) configured to remove thermal energy from the first fluid. The cooling device may for example be an evaporator of a refrigeration circuit having a compressor powered by the rechargeable battery 2 during the charging of the rechargeable battery 2 by the power source 3, as a non-limiting example.

In use, the pump 44 and the cooling device are activated during a charging of the rechargeable battery 2. The cooling conditioning function may be used when the ambient temperatures surrounding the vehicle are high, such as above 25° C., as a non-limiting example. The pump 44 causes the first fluid to circulate through the cooling device to remove thermal energy from the first fluid. The cooled first fluid then flows to the thermal storage element 60 where thermal energy is transferred from the thermal storage element 60 to the cooled first fluid. Thermal energy is thereby removed from the thermal storage element 60 to cool the thermal storage element 60. When the charging of the rechargeable battery 2 is discontinued and the vehicle is first activated for operation, the first fluid is caused to circulate through the first heat exchanger 24 while the cooling device is no longer operated. The first fluid receives thermal energy from the air passing through the first heat exchanger 24 to cool the air while warming the first fluid. The warmed first fluid then continues to circulate through the first fluid circuit 40 where it again encounters the thermal storage element 60. The thermal storage element 60 then receives thermal energy from the warmed first fluid, thereby cooling the first fluid. The first fluid is then able to be passed through the first heat exchanger 24 to again cool the air to be distributed to the passenger cabin. This process is repeated until the cooling capacity of the thermal storage element 60 has been diminished such that operation of the cooling conditioning function is no longer efficient or required.

From the foregoing description, one ordinarily skilled in the art can easily ascertain the essential characteristics of this invention and, without departing from the spirit and scope thereof, can make various changes and modifications to the invention to adapt it to various usages and conditions

What is claimed is:

1. A method of transferring thermal energy to air distributed to a passenger cabin of a vehicle, the vehicle powered by a rechargeable power source, the method comprising the steps of:
    adding thermal energy to a thermal storage element during a charging of the rechargeable power source; and
    transferring thermal energy from the thermal storage element to the air distributed to the passenger cabin following a discontinuation of the charging of the rechargeable power source, wherein a first fluid transfers the thermal energy from the thermal storage element to the air distributed to the passenger cabin, wherein the first fluid flows through a first heat exchanger in thermal communication with the air distributed to the passenger cabin, wherein the first heat exchanger is disposed in a housing having the air distributed to the passenger cabin flowing therethrough, and wherein the first heat exchanger is disposed in the housing upstream of a cooling device and a heating device with respect to a direction of flow of the air distributed to the passenger cabin through the housing.

2. The method of claim 1, wherein the first fluid is at least partially formed from glycol.

3. The method of claim 1, wherein the first fluid is circulated through a coolant circuit including the thermal storage element, and wherein the first heat exchanger is disposed on a conditioning branch extending from the coolant circuit.

4. A method of transferring thermal energy to air distributed to a passenger cabin of a vehicle, the vehicle powered by a rechargeable power source, the method comprising the steps of:
    adding thermal energy to a thermal storage element during a charging of the rechargeable power source; and
    transferring thermal energy from the thermal storage element to the air distributed to the passenger cabin following a discontinuation of the charging of the rechargeable power source, wherein the thermal energy is added to the thermal storage element by flowing a first fluid through the thermal storage element.

5. The method of claim 4, wherein the first fluid flows through a fluid heater before the first fluid flows through the thermal storage element.

6. A method of transferring thermal energy to air distributed to a passenger cabin of a vehicle, the vehicle powered by a rechargeable power source, the method comprising the steps of:
    adding thermal energy to a thermal storage element during a charging of the rechargeable power source; and
    transferring thermal energy from the thermal storage element to the air distributed to the passenger cabin following a discontinuation of the charging of the rechargeable power source, wherein the rechargeable power source is charged by a power source independent of the vehicle, wherein the adding of the thermal energy to the thermal storage element includes operation of a pump and a fluid heater, wherein the pump and the fluid heater are powered by the power source independent of the vehicle during the charging of the rechargeable power source.

7. The method of claim 6, wherein the rechargeable power source is a battery powering an electric motor of the vehicle.

8. The method of claim 6, wherein the fluid heater is not operated and the pump is operated during the transferring of the thermal energy from the thermal storage element to the air distributed to the passenger cabin, wherein the pump is powered by the rechargeable power source following discontinuation of the charging of the rechargeable power source.

9. The method of claim 1, wherein an electric heating device adds thermal energy to the air distributed to the passenger cabin following the discontinuation of the charging of the rechargeable power source.

10. The method of claim 1, wherein the transferring of the thermal energy from the thermal storage element to the air distributed to the passenger cabin occurs during operation of the vehicle, and wherein the vehicle is powered exclusively by the rechargeable power source.

11. The method of claim 1, wherein the thermal storage element is a heat conductive structure having a first fluid flowing therethrough, the first fluid transferring the thermal energy from the thermal storage element to the air distributed to the passenger cabin.

12. The method of claim 1, wherein the thermal storage element is a structure having a thermal energy storage material disposed therein, the thermal energy storage material exchanging thermal energy with a first fluid transferring the thermal energy from the thermal storage element to the air distributed to the passenger cabin.

* * * * *

UNITED STATES PATENT AND TRADEMARK OFFICE
CERTIFICATE OF CORRECTION

PATENT NO. : 10,017,030 B2  
APPLICATION NO. : 15/277072  
DATED : July 10, 2018  
INVENTOR(S) : Nicos Agathocleous et al.

Page 1 of 1

It is certified that error appears in the above-identified patent and that said Letters Patent is hereby corrected as shown below:

In the Specification

On Column 1, Line 4, before the "FIELD OF THE INVENTION", please insert the following paragraph:

--STATEMENT REGARDING FEDERALLY SPONSORED RESEARCH OR DEVELOPMENT  
This invention was made with government support under DE - EE0006445 awarded by the U.S. Department of Energy. The Government therefore has certain rights to the invention.--

Signed and Sealed this  
Twenty-second Day of October, 2019

Andrei Iancu  
*Director of the United States Patent and Trademark Office*